United States Patent [19]
Schäfer

[11] Patent Number: 5,312,171
[45] Date of Patent: May 17, 1994

[54] DRIVE-SLIP CONTROL SYSTEM

[75] Inventor: Jochen Schäfer, Bietigheim-Bissingen, Fed. Rep. of Germany

[73] Assignee: Robert Bosch GmbH, Stuttgart, Fed. Rep. of Germany

[21] Appl. No.: 867,207

[22] PCT Filed: Oct. 22, 1991

[86] PCT No.: PCT/DE91/00821

§ 371 Date: Jun. 26, 1992

§ 102(e) Date: Jun. 26, 1992

[87] PCT Pub. No.: WO92/07744

PCT Pub. Date: May 14, 1992

[30] Foreign Application Priority Data

Nov. 2, 1990 [DE] Fed. Rep. of Germany ....... 4034816

[51] Int. Cl.$^5$ .............................. B60T 8/76
[52] U.S. Cl. ................... 303/103; 364/426.03; 303/111
[58] Field of Search ............ 303/103, 110, 113.1, 303/113.2, 100, 111; 364/426.01–426.03; 180/197

[56] References Cited

U.S. PATENT DOCUMENTS

| 4,720,794 | 1/1988 | Skarvada | 364/426.02 |
| 4,736,814 | 4/1988 | Yogo et al. | 364/426.08 X |
| 4,760,893 | 8/1988 | Siglet et al. | 364/426.08 X |
| 4,802,711 | 2/1989 | Muto et al. | 364/426.02 X |
| 4,811,232 | 3/1989 | Hoashi et al. | 364/426.02 |
| 4,836,619 | 6/1989 | Muto | 364/426.02 X |
| 4,924,396 | 5/1990 | Fujioka et al. | 364/426.03 |
| 4,989,923 | 2/1991 | Lee et al. | 303/103 X |
| 5,009,279 | 4/1991 | Matsuda | 180/197 |
| 5,019,984 | 5/1991 | Masaki et al. | 303/103 X |
| 5,040,120 | 8/1991 | Hoffmann | 364/426.02 X |

FOREIGN PATENT DOCUMENTS 2638403 5/1990 France.

Primary Examiner—Robert J. Oberleitner
Assistant Examiner—Alfred Muratori
Attorney, Agent, or Firm—Spencer, Frank & Schneider

[57] ABSTRACT

In a drive-slip control system, if the unfiltered wheel speed of a non-driven wheel is below the filtered reference speed by a predetermined amount, the reference speed is increased in steps. This prevents the control system from being triggered erroneously when a non-driven wheel is retarded by snow, water etc.

15 Claims, 1 Drawing Sheet

DRIVE-SLIP CONTROL SYSTEM

BACKGROUND OF THE INVENTION

The present invention relates to a driver-slip control system for a wheeled vehicle in which a wheel is braked and/or the driving torque is reduced if the speed of a driven wheel exceeds, to a predetermined extent, a reference speed obtained from the speed of a non-driven wheel by filtering.

A drive-slip control system having the above features is known from German Patent 1,806,671. When a vehicle drives into deep snow on one side with such a drive-slip control system, drive slip is detected at the driven rear wheel due to the retarded non-driven front wheel which simultaneously forms the reference, since the filtered speed (reference) is completely or partially corrected to the wheel speed. This is in principle incorrect since the vehicle is in fact travelling at a higher speed As a result, the driven rear wheel is braked or the driving torque reduced.

ADVANTAGES OF THE INVENTION

According to the invention, if the unfiltered speed signal of the non-driven wheels is more than, for example, 2 km/h below the filtered speed value, the filtered speed is raised with a slope of, for example 0.1 km/h/10 ms to the maximum value of the filtered speeds at the front left or front right. Matching to the filtered speed of the other wheel is also possible.

The invention is based on the recognition that the unfiltered speed signal exhibits relatively pronounced fluctuations in the case of deep snow, slush and pools of water (aquaplaning) etc. According to the invention, this is monitored and the system reacts to this condition if it arises.

The invention uses a relatively simple logic to ensure that lowering of the reference speed in the case of slush or deep snow etc. on one side is prevented.

DETAILED DESCRIPTION OF THE PREFERRED EMBODIMENT

Figure 1:
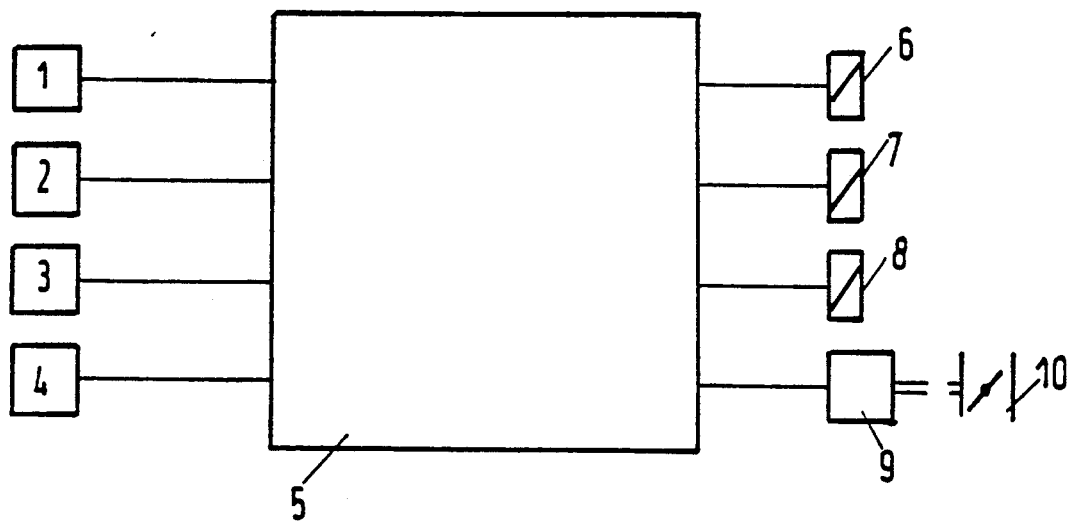
FIG. 1 is a block diagram of a drive-slip control system.

An illustrative embodiment of the invention is explained with reference to the drawing. FIG. 1 shows a drive-slip control system consisting of speed sensors 1 and 2 assigned to the non-driven wheels and sensors 3 and 4 assigned to the driven wheels, an evaluation circuit 5 for the sensor signals and two solenoid valves 6 and 7 assigned to the driven wheels, an inlet valve 8 operative in drive-slip control mode, and an actuating block 9 for a throttle valve 10.

If one of the driven wheels spins, this is ascertained in the evaluation circuit 5 by determination of the slip s $$s = \frac{V_{Ref} - V_3}{V_{Ref}};$$

$V_{Ref} = V_1$ filtered) and the permissible brake is actuated via the solenoid valves 6, 8 and the engine torque reduced via the block 9.

Figure 2:
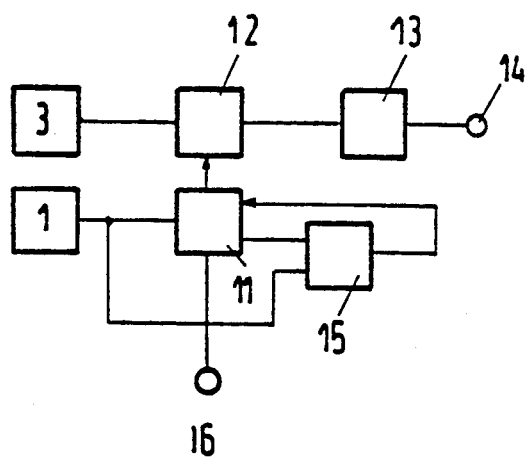
FIG. 2 is a detailed block diagram of an evaluation circuit according to the invention with inputs from sensor 1 (non-driven) and sensor 3 (driven).

FIG. 2 shows a block diagram in which only the signals of sensors 1 and 3 are processed. The signal of sensor 1 is filtered in a filter block 11 (e.g. 0.5 km/h/10 ms). The output signal (the reference signal) is fed to a slip former 12. If the drive slip exceeds a comparison value in a block 13, an actuating signal is obtained for the valves 6 and 8 and the actuating block 9 (terminal 14).

In a comparator 15, the unfiltered speed ($V_1$) is compared to the filtered speed ($V_{Ref}$) If the speed $V_1$ is below the reference speed by a predetermined value of, for example, 2 km/h, the filter block 11 is activated and the filtered output signal is increased in steps of, for example, 0.5 km/h per 10 ms until the reference speed of the other wheel, fed in at terminal 16, is reached.

I claim:

1. In a drive-slip control system for a wheeled vehicle including a driven wheel sensor means for measuring the speed of a driven wheel and for producing a drive wheel speed signal, a non-driven wheel sensor means for measuring the speed of a non-driven wheel and for producing an unfiltered speed signal for the non-driven wheel, and a reducing means, responsive to the driven wheel speed signal and to a filtered reference speed signal, for reducing the speed of the driven wheel if the speed of the driven wheel exceeds, by a predetermined first amount, a reference speed obtained by filtering of the unfiltered speed signal of the non-driven wheel; the improvement comprising:

a filter means for filtering the unfiltered speed signal from the non-driven wheel sensor means to produce the filtered reference speed signal fed to said reducing means and for increasing the filtered reference speed signal when said filter means receives a filter activation signal; and a comparator means for comparing the unfiltered speed signal from the non-driven wheel sensor means with the filtered reference speed signal to determine whether the unfiltered speed signal for the non-driven wheel is smaller by at least a predetermined second amount than the filtered reference speed signal and, if this condition occurs, for producing said filter activation signal for said filter means to cause the filtered reference speed signal to be increased.

2. A drive-slip control system according to claim 1, wherein the filter means increases the filtered reference speed signal in steps.

3. A drive-slip control system according to claim 2, wherein the filter means increases the filtered reference speed signal to a second filtered reference speed of a second non-driven wheel.

4. A drive-slip control system according to claim 1, wherein the filter means increases the filtered reference speed signal to the larger of the filtered reference speed of the non-driven wheel and a second filtered reference speed of a second non-driven wheel.

5. A drive-slip control system according to claim 1, wherein the speed of the driven wheel is reduced by braking the driven wheel.

6. A drive-slip control system according to claim 1, wherein the speed of the driven wheel is reduced by reducing the driving torque of the driven wheel.

7. A drive-slip control system according to claim 1, wherein the second amount is a percentage of the unfiltered speed signal for the non-driven wheel.

8. In a method for controlling a drive-slip control system for a wheeled vehicle including reducing a speed of a driven wheel if the speed of the driven wheel exceeds by a redetermined first amount a reference speed obtained by filtering an unfiltered speed of a non-driven wheel; the improvement comprising increasing the reference speed if the unfiltered speed of the non-driven wheel is smaller by at least a second amount than the reference speed.

9. A method for controlling a drive-slip control system according to claim 8, wherein the reference speed is increased in steps.

10. A method for controlling a drive-slip control system according to claim 8, wherein the reference speed is increased to a filtered speed of a second non-driven wheel.

11. A method for controlling a drive-slip control system according to claim 9, wherein the reference speed is increased to the larger of the reference speed of the non-driven wheel and a filtered speed of a second non-driven wheel.

12. A method for controlling a drive-slip control system according to claim 9, wherein the second amount is a percentage of the unfiltered speed of the non-driven wheel.

13. A method for controlling a drive-slip control system according to claim 8, wherein the speed of the driven wheel is reduced by braking the driven wheel.

14. A method for controlling a drive-slip control system according to claim 8, wherein the speed of the driven wheel is reduced by reducing the driving torque of the driven wheel.

15. A method for controlling a drive-slip control system according to claim 8, wherein the second amount is a predetermined amount.

* * * * *